(12) United States Patent
Imm

(10) Patent No.: US 10,595,526 B1
(45) Date of Patent: Mar. 24, 2020

(54) BIG-GAME TOWING HITCH YOKE

(71) Applicant: Robert D. Imm, Tomahawk, WI (US)

(72) Inventor: Robert D. Imm, Tomahawk, WI (US)

(*) Notice: Subject to any disclaimer, the term of this patent is extended or adjusted under 35 U.S.C. 154(b) by 0 days.

(21) Appl. No.: 16/205,863

(22) Filed: Nov. 30, 2018

Related U.S. Application Data

(60) Provisional application No. 62/592,897, filed on Nov. 30, 2017.

(51) Int. Cl.
| | | |
|---|---|---|
| *B60D 1/52* | (2006.01) | |
| *A01M 31/00* | (2006.01) | |
| *B60D 1/00* | (2006.01) | |
| *B60P 3/04* | (2006.01) | |

(52) U.S. Cl.
CPC .............. *A01M 31/006* (2013.01); *B60D 1/00* (2013.01); *B60D 1/52* (2013.01); *B60P 3/04* (2013.01); *B60D 2001/008* (2013.01)

(58) Field of Classification Search
CPC ........ B60D 1/167; B60D 1/1675; B60D 1/54; B60D 1/173; B60P 1/48; Y10S 224/924; Y10S 224/921
See application file for complete search history.

(56) References Cited

U.S. PATENT DOCUMENTS

| | | | |
|---|---|---|---|
| 3,572,765 A | 3/1971 | Tieben | |
| 3,947,062 A * | 3/1976 | Pierce .................. | B60D 1/54 293/116 |
| 4,614,354 A * | 9/1986 | Stagner ................ | B60D 1/143 280/415.1 |
| 4,640,523 A * | 2/1987 | Wolmarans ........... | B60D 1/143 280/491.4 |
| 5,190,195 A * | 3/1993 | Fullhart ................ | B60R 9/10 224/497 |
| 5,232,240 A | 8/1993 | Johnson | |
| 5,516,140 A * | 5/1996 | Hinte .................... | B60D 1/02 280/491.1 |
| 5,685,686 A * | 11/1997 | Burns ................... | B60R 9/06 224/282 |
| 5,765,851 A * | 6/1998 | Parent .................. | B60D 1/143 280/491.1 |
| 5,873,595 A | 2/1999 | Hinte | |
| 5,915,715 A * | 6/1999 | Ford ..................... | B60D 1/155 280/460.1 |
| 5,957,477 A | 9/1999 | Russell et al. | |
| 6,152,675 A | 11/2000 | Compton | |
| 6,705,821 B2 | 3/2004 | Philipps et al. | |
| 7,004,490 B2 | 2/2006 | Klar | |
| 7,261,229 B1 * | 8/2007 | Allen .................... | B60R 9/06 224/495 |
| 7,374,388 B2 | 5/2008 | Holt | |
| 7,419,076 B1 * | 9/2008 | Grothues .............. | B60R 9/08 114/343 |

(Continued)

FOREIGN PATENT DOCUMENTS

DE    102015004556    6/2017

OTHER PUBLICATIONS

"Blue OX BX7365 Alpha Tow Bar", https://www.rvupgradestore.com/Blue-OX-Alpha-Tow-Bar-p/bx7365.htm—Downloaded Oct. 2018.

(Continued)

*Primary Examiner* — Brian D Nash
(74) *Attorney, Agent, or Firm* — Peacock Law P.C.; Justin R. Jackson; Isaac Estrada

(57) ABSTRACT

Big-game towing hitch yoke system for use in the standard hitch receiver of a motorized vehicle, such as a UTV. Some embodiments of the invention comprise big-game towing hitch yoke systems that are collapsible for increased versatility and easy storage and transportation.

20 Claims, 5 Drawing Sheets

(56) References Cited

U.S. PATENT DOCUMENTS

| | | | |
|---|---|---|---|
| 7,837,216 B1 | 11/2010 | Greaves, Jr. et al. | |
| 8,899,609 B2* | 12/2014 | Mayfield | B60D 1/58 |
| | | | 280/491.1 |
| 9,308,790 B1* | 4/2016 | Sharp | B60D 1/167 |
| 2006/0249926 A1 | 11/2006 | Smith | |
| 2008/0099522 A1* | 5/2008 | Clausen | B60R 9/06 |
| | | | 224/519 |
| 2015/0083769 A1* | 3/2015 | Williams | B60R 9/10 |
| | | | 224/488 |
| 2018/0354427 A1* | 12/2018 | Yazdian | B60R 9/10 |

OTHER PUBLICATIONS

"Guide Gear Deluxe Deer Hoist and Gambrel, Swivel Hitch Lift System", https://www.sportsmansguide.com/product/index/guide-gear-deluxe-deer-hoist-and-gambrel-swivel-hitch-lift-system?a=681080&pm2d=CSE-SPG-25-NEXTAG&utm_medium=cse&utm_source=nextag&utm_campaign=CI&ntclickid=-8646191080923587152—Downloaded Oct. 2018.

"New MTN-G Hitch Mounted 400LB Big Game Hunting Deer Hoist winch Lift Gambler Set", https://www.walmart.com/ip/New-MTN-G-Hitch-Mounted-400LB-Big-Game-Hunting-Deer-Hoist-winch-Lift-Gambler-Set/898514455?sourceid=csent02ac53edd064234adc99a9d75715cb0a51&wmlspartner=nextagcom2&affcmpid=1686503467&tmode=0000&veh=cse&nextagid=-86461910809235668, Downloaded Oct. 2018.

"Truck Bed Extender Roof Carrier for 2" Receiver", https://www.palletforks.com/truck-bed-extender-roof-carrier-for-2-receiver.html—Downloaded Oct. 2018.

\* cited by examiner

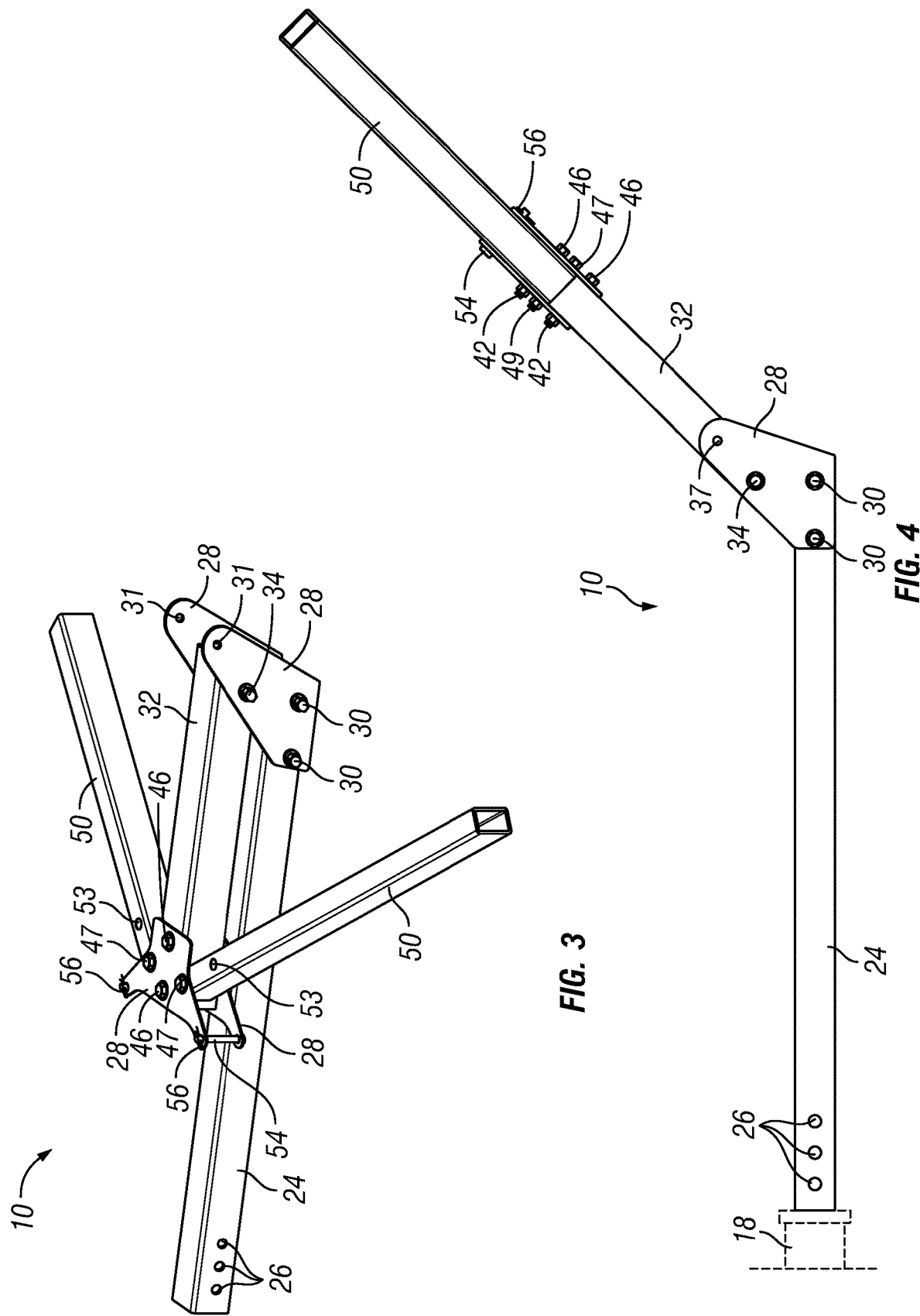

BIG-GAME TOWING HITCH YOKE

CROSS-REFERENCE TO RELATED APPLICATIONS

This application claims priority to and the benefit of the filing of U.S. Provisional Patent Application No. 62/592,897, entitled "BIG-GAME TOWING HITCH YOKE", filed on Nov. 30, 2017, and the specification thereof is incorporated herein by reference.

BACKGROUND OF THE INVENTION

Field of the Invention (Technical Field)

Embodiments of the present invention relate generally to towing hitches, and more particularly to towing hitches that can be removably installed on a conventional hitch receiver, and that can collapse for storage and transportation.

Big-game hunting presents many challenges, not the least of which is hauling out downed game. Sometimes, hunting along forestry roads or dirt roads of oil and gas installations allows the use of a motorized vehicle such as a side by side or utility task vehicle ("UTV") for the task. Some animals are simply too heavy to haul without the aid of a motorized vehicle such as a UTV. For example, an adult male moose can weigh between 850 and 1500 pounds. When the topology of the terrain permits it, it is preferable to haul large game using a motorized vehicle such as a UTV. Embodiments of the invention relate to big-game towing hitch yokes for use in the standard hitch receiver of a motorized vehicle, such as a UTV. Although conventional towing hitch tools are typically very bulky, in one embodiment of the invention, a big-game towing hitch yoke is collapsible for increased versatility and easy storage and transportation.

BRIEF SUMMARY OF THE INVENTION

Embodiments of the invention provide big-game collapsible hitch tow yoke systems comprising, in one embodiment: a first elongated member comprising a front end and a rear end, and configured in shape at the front end to be receivable into a hitch receiver; a second elongated member comprising a front end and a rear end and the second elongated member being pivotally connected at its front end to the rear end of the first elongated member; the second elongated member being configured also to pivotally fold down and forward for a collapsed configuration of the system, and to pivotally fold up and backward for an extended configuration of the system; third and fourth elongated members comprising front ends and rear ends, the third and fourth elongated members being pivotally connected at their front ends to the sides of the rear end of the second elongated member and configured to pivotally fold inward for a collapsed configuration of the system, and to pivotally fold outward to form a Y-shaped yoke in an extended configuration of the system. In one embodiment, the collapsed and extended configurations is lockable with, for example, removable pins. In one embodiment, the second elongated member pivotally connects at its front end to the rear end of the first elongated member with bolted mounting brackets. In one embodiment, the third and fourth elongated members pivotally connect to the sides of the rear end of the second elongated member with perforated bolted plates.

In one embodiment, the front end of the first elongated member comprises a plurality of lateral perforations for locking it in the hitch receiver, with, for example, a locking pin.

In one embodiment, the second elongated member is configured to pivotally fold up and backward preferably at an angle between approximately 10 degrees and approximately 70 degrees relative to a horizontal plane of the first elongated member for an extended configuration of the system; more preferably at an angle between approximately 20 degrees and approximately 60 degrees relative to the horizontal plane of the first elongated member; and most preferably at an angle between approximately 30 degrees and approximately 50 degrees relative to the horizontal plane of the first elongated member.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 3 is a side perspective view of the embodiment of FIG. 2 assembled and folding into a collapsed configuration with its lateral bars partially folded;

FIG. 4, is a side view of the embodiment of FIG. 2 in an extended configuration;

DETAILED DESCRIPTION OF THE INVENTION

In the following detailed description, numerous specific details are set forth in order to provide a thorough understanding of the embodiments of the invention. However, upon studying this application it will be understood by one of ordinary skill in the art that the embodiments may be practiced without these specific details. For instance, well known methods of operation or techniques may not be shown in detail. Technical and scientific terms used in this description have the same meaning as commonly understood to one of ordinary skill in the art to which this subject matter belongs.

Embodiments of the present invention provide big-game towing hitch yokes for use in a standard hitch receiver of a vehicle, such as a truck.

Figure 1:
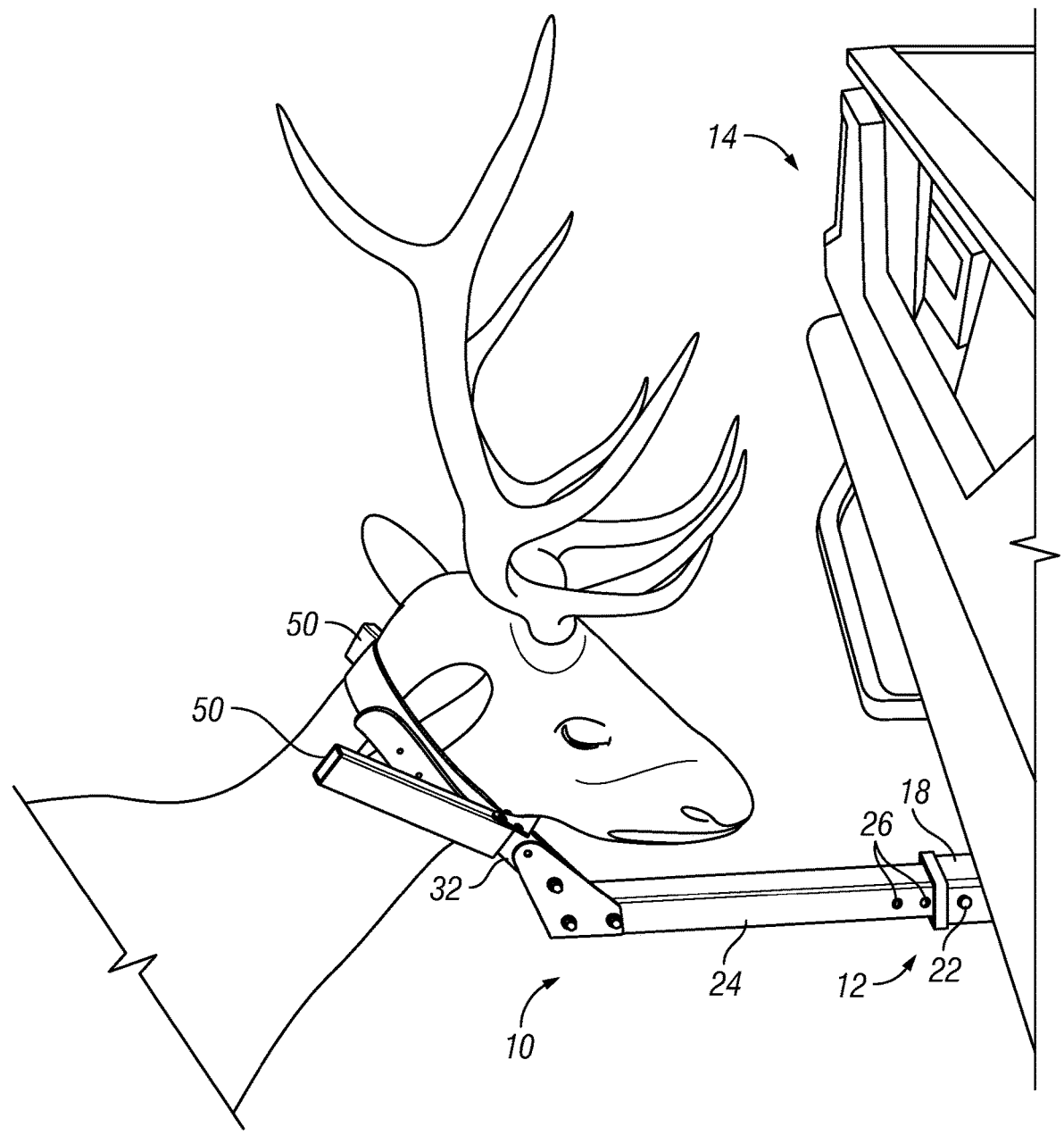
FIG. 1 is a perspective view of an embodiment of the present invention in use to haul a downed elk with a truck.
Figure 2:
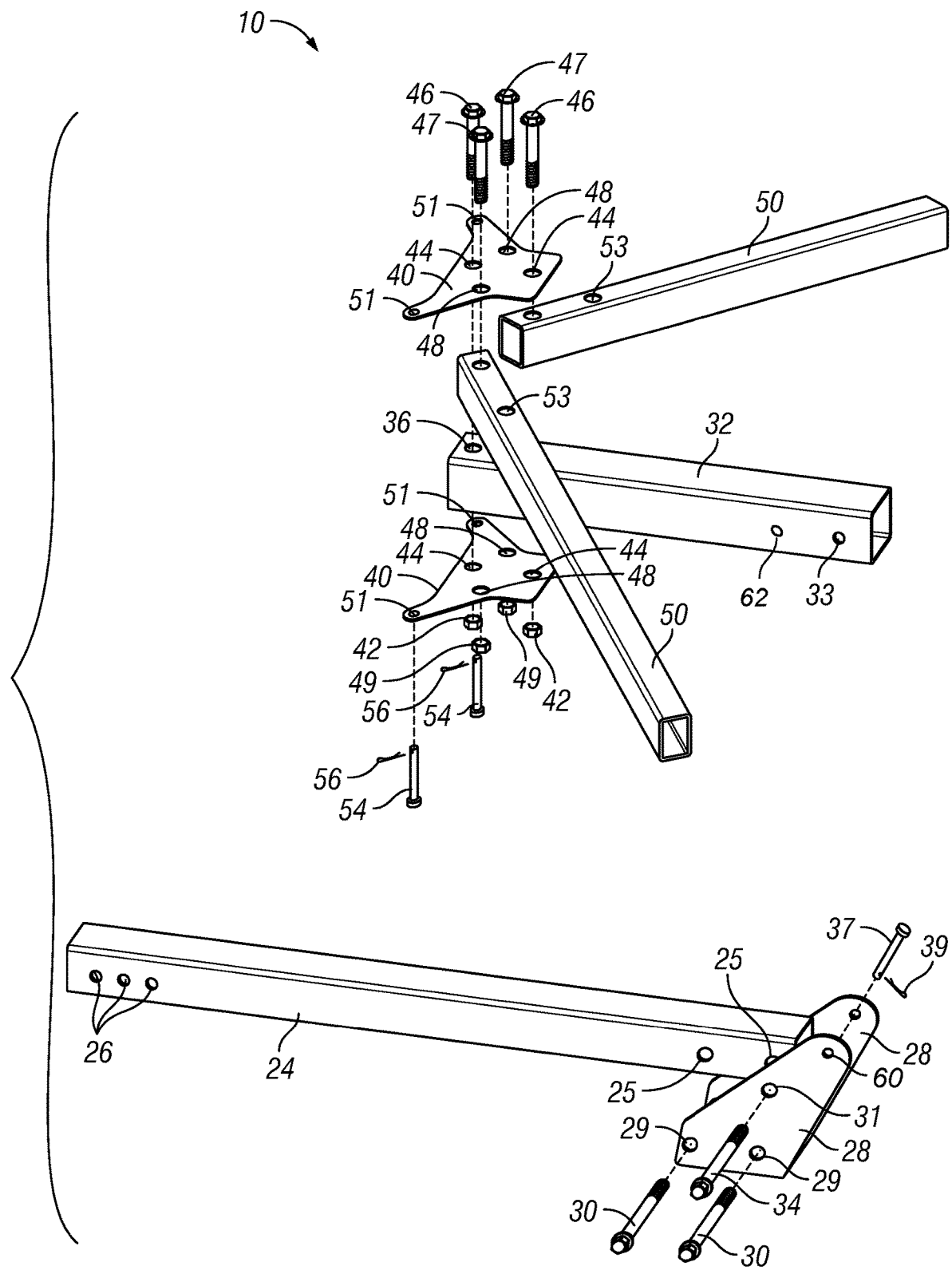
FIG. 2 is an exploded perspective view of components of the embodiment of FIG. 1.
Figure 5:
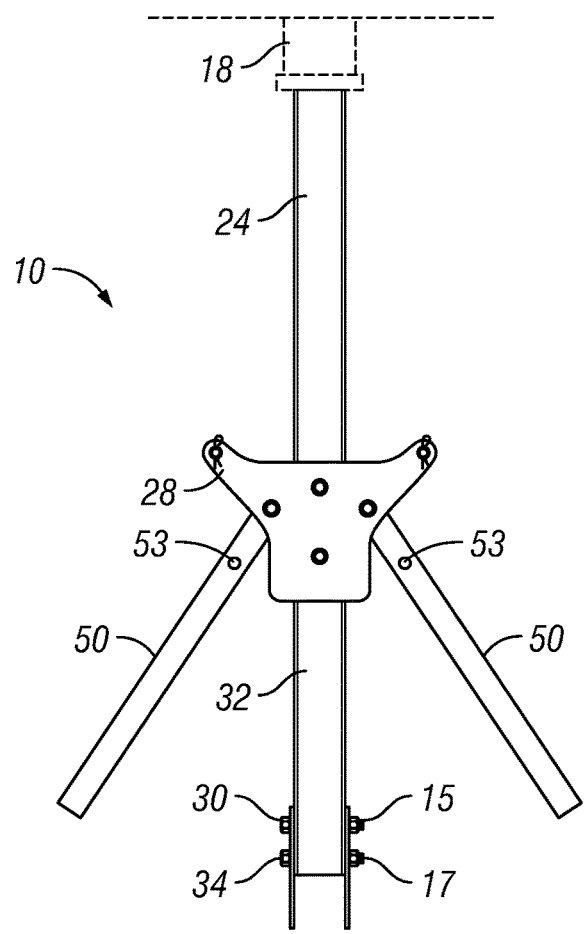
FIG. 5 is a top view of the embodiment of FIG. 2.
Figure 6:
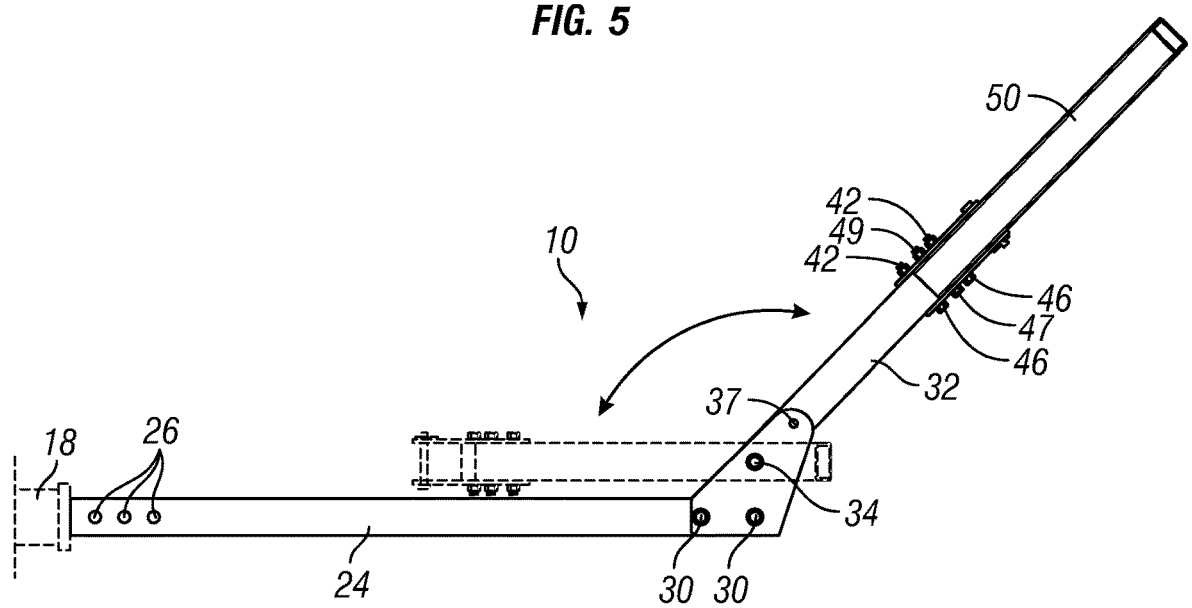
FIG. 6 is a side view of the collapsed and extended configurations of the apparatus of FIG. 2 in more detail.
Figure 7:
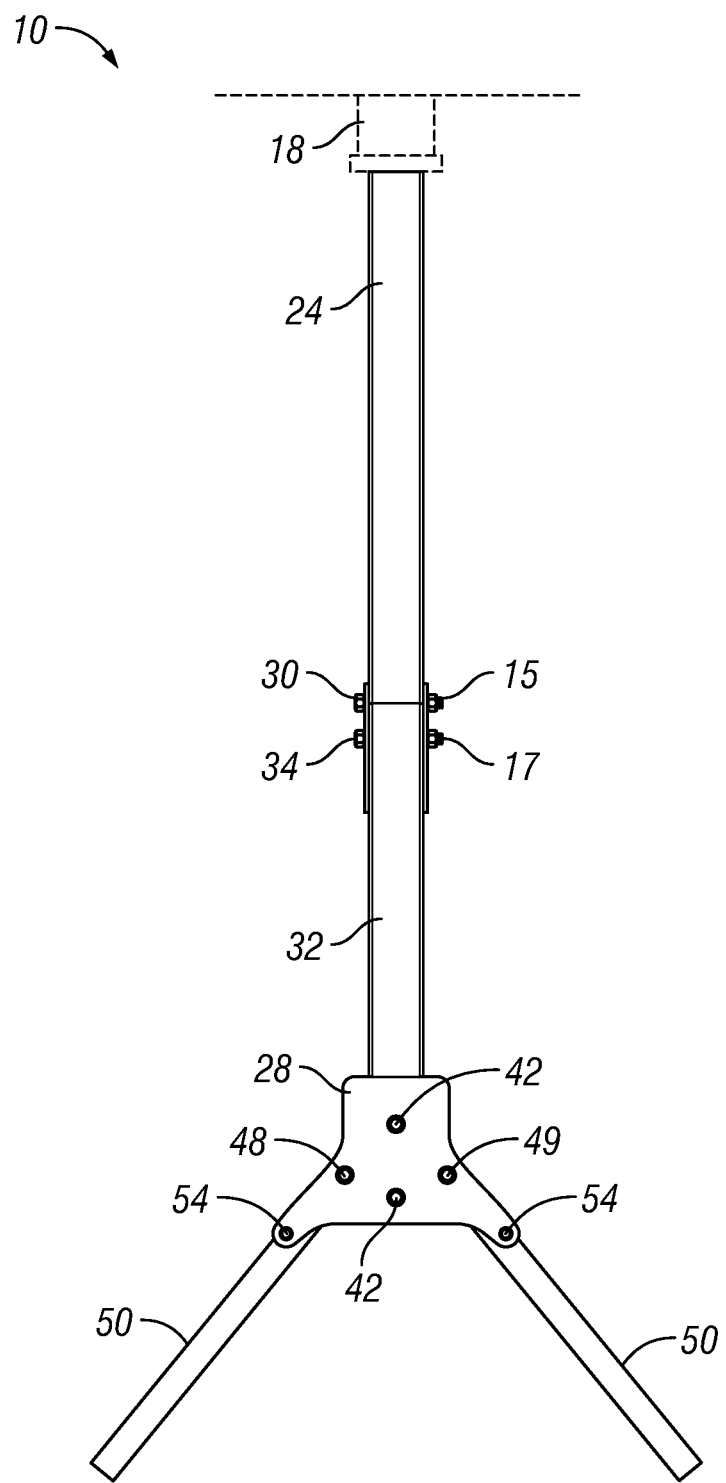
FIG. 7 is a top view of the embodiment of FIG. 2 in an extended configuration.

Referring now to the Figures, and more particularly to FIG. 1, in one embodiment of the present invention, collapsible big-game towing hitch yoke system 10 is illustrated mounted in conventional hitch receiver 12 on towing vehicle 14. Conventional hitch receiver 12 preferably comprises hitch tube 18 with apertures on its sides for locking pin 22. In one embodiment, collapsible big-game towing hitch yoke system 10 comprises forward elongated horizontal tube 24 that comprises one or more side perforations 26 on a front portion for selectively, lockable receipt within hitch tube 18 with locking pin 22 in a conventional manner. In one embodiment, collapsible big-game towing hitch yoke system 10 does not comprise one or more side perforations 26.

Referring to FIGS. 2-7, in one embodiment, at its back portion, elongated horizontal tube 24 comprises perforations 25, and right and left mounting brackets 28 comprising a plurality of lower perforations 29, and at least two upper perforations 31. Preferably, mounting brackets 28 are connected to elongated horizontal tube 24, with for example, a plurality of bolts 30 passing through lower perforations 29 and perforations 25 being secured with nuts 15. In one embodiment, collapsible big-game towing hitch yoke system 10 does not comprise perforations 25, brackets 28, perforations 29, or upper perforations 31.

In one embodiment, mounting brackets 28 are formed from one single metal plate that is shaped to fold around the bottom of the back portion of elongated horizontal tube 24. Preferably, the top end-portion of mounting brackets 28 protrude upward and backward and are at least substantially parallel and spaced apart to receive the front portion of yoke tube 32. In one embodiment, yoke tube 32 comprises perforations 33 at its front end, and is removably attached to mounting brackets 28 with, for example, bolt 34 passing through perforations 31 and 33 to be secured with one or more nuts 17. In one embodiment, when only bolt 34 is attaching yoke tube 32, it can pivotally fold down/forward for a collapsed configuration of the system. In one embodiment, when quick release perforated pin 37 passing through openings 60 and 62 and secured with clip 39 to position yoke tube 32 in an extended configuration of the system, yoke tube 32 is preferably angled upward and backward at between approximately 10 degrees and 70 degrees relative to a horizontal plane of elongated tube 24; more preferably between approximately 20 degrees and approximately 60 degrees relative to the horizontal plane of elongated tube 24; and most preferably, between approximately 30 degrees and approximately 50 degrees relative to the horizontal plane of elongated tube 24. In one embodiment yoke tube 32 does not comprise perforations 33.

In one embodiment, yoke tube 32 comprises openings 36 at its back portion to connect to a pair of perforated plates 40. In one embodiment, perforated plates 40 are made from one single metal plate that is bent to be at least substantially parallel and spaced to fit around the front portion of yoke tube 32. In one embodiment, collapsible big-game towing hitch yoke system 10 does not comprise perforated plates 40.

In one embodiment, perforated plates 40 preferably comprise central perforations 44 that correspond to openings 36 to attach to yoke tube 32 with, for example, bolts 46 and nuts 42. Preferably, yoke tube 32 further comprises side perforations 48 for attaching right and left elongated yoke lateral bars 50 with bolts 47 and nuts 49. In one embodiment, elongated yoke lateral bars 50 can pivotally fold inward to be at least substantially parallel to yoke tube 32 for a collapsed configuration of the system when only bolts 47 and nuts 49 are attaching them to plates 40. In the system's extended configuration, elongated yoke lateral bars 50 are preferably secured with quick release perforated pins 54 passing through openings 51 and 53, and are secured with clips 56 to form a "Y" shaped yoke as illustrated. See e.g., FIGS. 6 and 7. In one embodiment, removable wire round lock pins, bolts and nuts, or other quick release suitable pins are used in lieu of quick release perforated pins 54 and clips 56.

In one embodiment, lateral bars 50 optionally comprise side perforations for strapping hooks to tie the head of the animal being hauled, or rings, hooks, posts, etc., for tying with straps, rope, cords, chains, etc. Optionally, lateral bars 50 comprise rings that are, for example, welded, bolted, clamped, etc. for strapping. In one embodiment, lateral bars 50 do not comprise any side perforations or rings.

In one embodiment, elongated yoke lateral bars 50 do not pivotally fold inward for a collapsed configuration. In one embodiment, yoke tube 32, does not pivotally fold down/forward for a collapsed configuration of the system.

Note that in the specification and claims, "about" or "approximately" means within twenty percent (20%) of the numerical amount cited. Although the invention has been described in detail with particular reference to these described embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A collapsible hitch tow yoke system comprising:
a first elongated member comprising a front portion and a rear portion and left and right sides, and said front portion receivable into a hitch receiver;
a second elongated member comprising a front portion and a rear portion, said second elongated member being pivotally connected at said front portion to said rear portion of said first elongated member;
said second elongated member configured to pivotally fold down for a collapsed configuration of said system, and to pivotally unfold for an extended configuration of said system;
third and fourth elongated members comprising front portions and rear portions;
said third and fourth elongated members being pivotally connected at their front portions to the sides of said rear portion of said second elongated member and configured to pivotally fold by each respectively swinging out to one of opposing left and right sides of said first elongated member for the collapsed configuration of said system, and to pivotally unfold by each respectively swinging out to one of the opposing left and right sides of said first elongated member to form a Y-shaped yoke in the extended configuration of said system.

2. The collapsible hitch tow yoke system of claim 1 wherein said collapsed and said extended configurations are lockable.

3. The collapsible hitch tow yoke system of claim 2 wherein said configurations lock in place.

4. The collapsible hitch tow yoke system of claim 1 wherein said second elongated member pivotally connects at said front portion to said rear portion of said first elongated member with bolted mounting brackets.

5. The collapsible hitch tow yoke system of claim 1 wherein said third and fourth elongated members pivotally connect to the sides of said rear portion of said second elongated member with perforated bolted plates.

6. The collapsible hitch tow yoke system of claim 1 wherein said front portion of said first elongated member comprises a plurality of lateral perforations for locking said first elongated member in said hitch receiver.

7. The collapsible hitch tow yoke system of claim 6 wherein said system is configured for locking said first elongated member in said hitch receiver with a locking pin.

8. The collapsible hitch tow yoke system of claim 1 wherein said second elongated member is configured to pivotally fold up and backward at an angle between about 10 degrees and about 70 degrees relative to a horizontal plane of said first elongated member for an extended configuration of said system.

9. The collapsible hitch tow yoke system of claim 8 wherein said angle is between about 20 degrees and about 60 degrees relative to said horizontal plane of said first elongated member.

10. The collapsible hitch tow yoke system of claim 9 wherein said angle is between about 30 degrees and about 50 degrees relative to said horizontal plane of said first elongated member.

11. The collapsible hitch tow yoke system of claim 1 wherein said second elongated member is permanently set at an angle between about 10 degrees and about 70 degrees relative to a horizontal plane of said first elongated member.

12. The collapsible hitch tow yoke system of claim 1 wherein said Y-shaped yoke is configured to tow big-game.

13. A method of towing an object comprising:
    providing a collapsible hitch tow yoke system according to claim 1;
    securing the collapsible hitch tow yoke system in an extended configuration to a towing hitch of a vehicle;
    securing the object to be towed to the collapsible hitch tow yoke system; and
    towing the object.

14. The method of claim 13 wherein the object is downed big-game.

15. A collapsible hitch tow yoke system comprising:
    a first elongated member comprising a front portion and a rear portion, and said front portion receivable into a hitch receiver;
    a second elongated member comprising a front portion and a rear portion, said second elongated member being pivotally connected at said front portion to said rear portion of said first elongated member;
    said second elongated member configured to pivotally fold down for a collapsed configuration of said system, and to pivotally unfold for an extended configuration of said system, and said second elongated member permanently set at an angle between about 10 degrees and about 70 degrees relative to a horizontal plane of said first elongated member;
    third and fourth elongated members comprising front portions and rear portions;
    said third and fourth elongated members being pivotally connected at their front portions to the sides of said rear portion of said second elongated member and configured to pivotally fold for the collapsed configuration of said system, and to pivotally unfold to form a Y-shaped yoke in the extended configuration of said system.

16. The collapsible hitch tow yoke system of claim 15 wherein said collapsed and said extended configurations are lockable.

17. The collapsible hitch tow yoke system of claim 16 wherein said configurations lock in place.

18. The collapsible hitch tow yoke system of claim 15 wherein said second elongated member pivotally connects at said front portion to said rear portion of said first elongated member with bolted mounting brackets.

19. The collapsible hitch tow yoke system of claim 15 wherein said third and fourth elongated members pivotally connect to the sides of said rear portion of said second elongated member with perforated bolted plates.

20. A method of towing an object comprising:
    providing a collapsible hitch tow yoke system according to claim 15;
    securing the collapsible hitch tow yoke system in an extended configuration to a towing hitch of a vehicle;
    securing the object to be towed to the collapsible hitch tow yoke system; and
    towing the object.

\* \* \* \* \*